US009880891B2

(12) United States Patent
Walls et al.

(10) Patent No.: US 9,880,891 B2
(45) Date of Patent: Jan. 30, 2018

(54) ASSIGNMENT AND FAILOVER OF RESOURCES

(75) Inventors: Jeffrey Joel Walls, Fort Collins, CO (US); Byron A. Alcorn, Fort Collins, CO (US); Thomas J. Flynn, Magnolia, TX (US); Roland M Hochmuth, Fort Collins, CO (US); Quoc P. Pham, Spring, TX (US); Valentin Popescu, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 12/241,541

(22) Filed: Sep. 30, 2008

(65) Prior Publication Data

US 2010/0082815 A1 Apr. 1, 2010

(51) Int. Cl.
*G06F 11/20* (2006.01)
*G06F 11/00* (2006.01)

(52) U.S. Cl.
CPC ............ *G06F 11/006* (2013.01); *G06F 11/20* (2013.01)

(58) Field of Classification Search
CPC .............................. G06F 11/006; G06F 11/20
USPC ....................................................... 709/226
See application file for complete search history.

(56) References Cited

U.S. PATENT DOCUMENTS

| | | | |
|---|---|---|---|
| 5,442,791 A | 8/1995 | Wrabetz et al. | |
| 5,491,796 A | 2/1996 | Wanderer et al. | |
| 5,610,810 A | 3/1997 | Nagahira et al. | |
| 5,781,536 A | 7/1998 | Ahmadi et al. | |
| 5,828,666 A | 10/1998 | Focsaneanu et al. | |
| 5,870,385 A | 2/1999 | Ahmadi et al. | |
| 5,884,037 A | 3/1999 | Aras et al. | |
| 5,987,506 A | 11/1999 | Carter et al. | |
| 5,991,292 A | 11/1999 | Focsaneanu et al. | |
| 6,009,103 A | 12/1999 | Woundy | |
| 6,324,177 B1 * | 11/2001 | Howes ................ | H01R 31/005 370/389 |
| 6,442,706 B1 | 8/2002 | Wahl et al. | |
| 6,483,912 B1 | 11/2002 | Kalmanek, Jr. et al. | |
| 6,597,671 B1 | 7/2003 | Ahmadi et al. | |
| 6,618,818 B1 | 9/2003 | Wahl et al. | |
| 6,741,515 B2 | 5/2004 | Lazar et al. | |
| 6,766,348 B1 | 7/2004 | Combs et al. | |
| 6,804,703 B1 * | 10/2004 | Allen ...................... | H04L 69/40 709/216 |
| 6,874,037 B1 | 3/2005 | Abram et al. | |
| 7,139,816 B2 * | 11/2006 | Anand .................. | G06F 9/4416 709/220 |
| 7,821,660 B2 * | 10/2010 | Kitada ................. | G06F 11/2028 358/1.13 |

(Continued)

FOREIGN PATENT DOCUMENTS

WO WO 2006/087415 * 8/2006
WO WO 2006087415 A1 * 8/2006 ............. G06F 17/30

*Primary Examiner* — Yin-Chen Shaw
*Assistant Examiner* — Darshan Dhruv
(74) *Attorney, Agent, or Firm* — HP Inc. Patent Department (57) ABSTRACT

Included are embodiments for assignment and failover of resources. More specifically, at least one embodiment of a method includes assigning, to a user of an access device (202), at least one primary resource (210, 212). Some embodiments include assigning, to the user of the access device (202), at least one backup resource (210, 212).

16 Claims, 11 Drawing Sheets

(56) References Cited

U.S. PATENT DOCUMENTS

| | | | | |
|---|---|---|---|---|
| 7,953,833 B2* | 5/2011 | Ben-Shaul | ............ | G06F 9/4416 709/220 |
| 8,166,503 B1* | 4/2012 | Rosenberg | ..... | H04N 21/234327 725/109 |
| 8,370,897 B1* | 2/2013 | Yang | ................... | H04L 41/0668 726/1 |
| 9,189,250 B2* | 11/2015 | Adams | ................. | G06F 9/4443 |
| 2002/0099829 A1* | 7/2002 | Richards et al. | ............. | 709/227 |
| 2002/0169889 A1* | 11/2002 | Yang | ...................... | H04L 29/06 709/244 |
| 2003/0163735 A1* | 8/2003 | Kameyama | ......... | G06F 11/2025 726/22 |
| 2003/0177324 A1* | 9/2003 | Timpanaro-Perrotta | | G06F 11/1448 711/162 |
| 2003/0179154 A1* | 9/2003 | Demsky | ................ | G06F 3/1438 345/1.1 |
| 2003/0225797 A1* | 12/2003 | Shields et al. | ................ | 707/202 |
| 2004/0133689 A1* | 7/2004 | Vasisht | ................ | H04W 28/18 709/228 |
| 2004/0249931 A1* | 12/2004 | Garg | ........................ | A61B 5/00 709/224 |
| 2005/0289540 A1* | 12/2005 | Nguyen et al. | .................. | 718/1 |
| 2006/0037084 A1* | 2/2006 | Brown | .................. | G06F 21/85 726/28 |
| 2006/0066886 A1* | 3/2006 | Narusawa | ............ | H04N 1/3871 358/1.13 |
| 2006/0132473 A1* | 6/2006 | Fuller | .................. | G06F 3/1438 345/204 |
| 2006/0240811 A1* | 10/2006 | De Luca | ................ | H04W 8/18 455/414.3 |
| 2007/0079252 A1* | 4/2007 | Ramnani | ............... | G06F 9/4443 715/781 |
| 2007/0174410 A1* | 7/2007 | Croft | .................... | G06F 3/1415 709/208 |
| 2008/0016580 A1* | 1/2008 | Dixit et al. | ..................... | 726/27 |
| 2008/0189628 A1* | 8/2008 | Liesche | ............ | G06F 17/30867 715/762 |
| 2008/0201455 A1* | 8/2008 | Husain | .................... | G06F 9/445 709/220 |
| 2008/0215767 A1* | 9/2008 | Nagami et al. | ................. | 710/19 |
| 2009/0055822 A1* | 2/2009 | Tolman | .................... | G06F 8/60 718/1 |
| 2009/0070752 A1* | 3/2009 | Alpern et al. | ................ | 717/148 |
| 2009/0164287 A1* | 6/2009 | Kies et al. | ........................ | 705/8 |
| 2009/0282359 A1* | 11/2009 | Saul | ...................... | G06F 3/0481 715/784 |
| 2010/0071042 A1* | 3/2010 | Hochmuth | ............ | H04L 67/125 726/7 |
| 2011/0107229 A1* | 5/2011 | Walls | ...................... | H04L 67/36 715/740 |
| 2011/0153826 A1* | 6/2011 | Ananthanarayanan | | G06F 11/0709 709/226 |

* cited by examiner

ASSIGNMENT AND FAILOVER OF RESOURCES

CROSS REFERENCE TO RELATED APPLICATIONS

This Application claims the benefit of U.S. Provisional Application Ser. No. 61/077,247, filed Jul. 1, 2008, titled "Assignment And Failover Of Resources" which is hereby incorporated by reference herein as if reproduced in full below.

BACKGROUND

Remote access to one or more computing resources, has become increasingly important. While the utilization of data centers, local networks, and/or other configurations may facilitate communication of remote data, allocation of primary resources and/or failover resources may be lacking. More specifically, many current implementations fail to adequately allocate specific and/or general resources to a user in a configuration with multiple users. Additionally, allocation of failover resources in such scenarios may also be inadequate.

SUMMARY

Included are embodiments for assignment and failover of resources. More specifically, at least one embodiment of a method, includes determining a monitor layout identifier for at least one access device and assigning, to a user of the access device, at least one primary resource. Some embodiments include assigning, to the user of the access device, at least one backup resource.

Also included are embodiments of a system. At least one embodiment of a system includes a processor and a memory that stores code configured to perform the following: determining a monitor layout identifier for at least one access device; assigning, to a user at least one primary resource; and assigning to the user at least one backup resource.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Depending on the particular configuration, some embodiments of this disclosure may utilize a user, an access device, a primary resource (specific and/or general), a backup resource (specific and/general) for each primary resource, and a monitor layout identifier (ID), and/or other components. More specifically, in some exemplary embodiments, in a network environment, a computer may be imaged with a specific set of applications that may be executed by any user. In other usage models, a computer may be imaged for a specific user in a specific circumstance. A general resource may include a resource that is used by some class of user without regard to the specific user. In such a configuration, if all of a user's personal documents are stored on a network share device, a general resource may be imaged with a suite of office applications that can be accessed by any user. A specific resource may include a resource that has been imaged for a specific user in a specific circumstance. In such a configuration, an IT manager and/or administrator may desire repeated access to a specific circumstance. A backup resource may include a resource that may be provisioned if a primary general resource and/or a specific resource is unable to be allocated. A backup resource may itself be a general resource and/or a specific resource. A monitor layout ID may be utilized as a linkage between access devices, resources, and users.

In operation, an administrator creates a monitor layout ID for a user. This identifier may be utilized as a local name. The monitor layout ID may then be assigned to one or more access devices. A user may additionally be assigned to one or more primary specific resources along with a specific and/or general backup resource and one or more primary general resources. Additionally, a user may be assigned to a monitor layout ID and one or more primary resources. Each resource's attributes may also be defined.

In operation of an exemplary embodiment, a user may approach an access device and log in. A provisioning engine of a remote device may utilize the user's identifier and a monitor layout ID to apply. The provisioning engine may then consult the user to resource mapping and attempts to allocate each primary resource. If any allocation fails, the provisioning engine attempts to allocate a backup resource. Once the allocations have been made, the access device may position and size each session according to the mapping provided by the provisioning engine.

Figure 1:
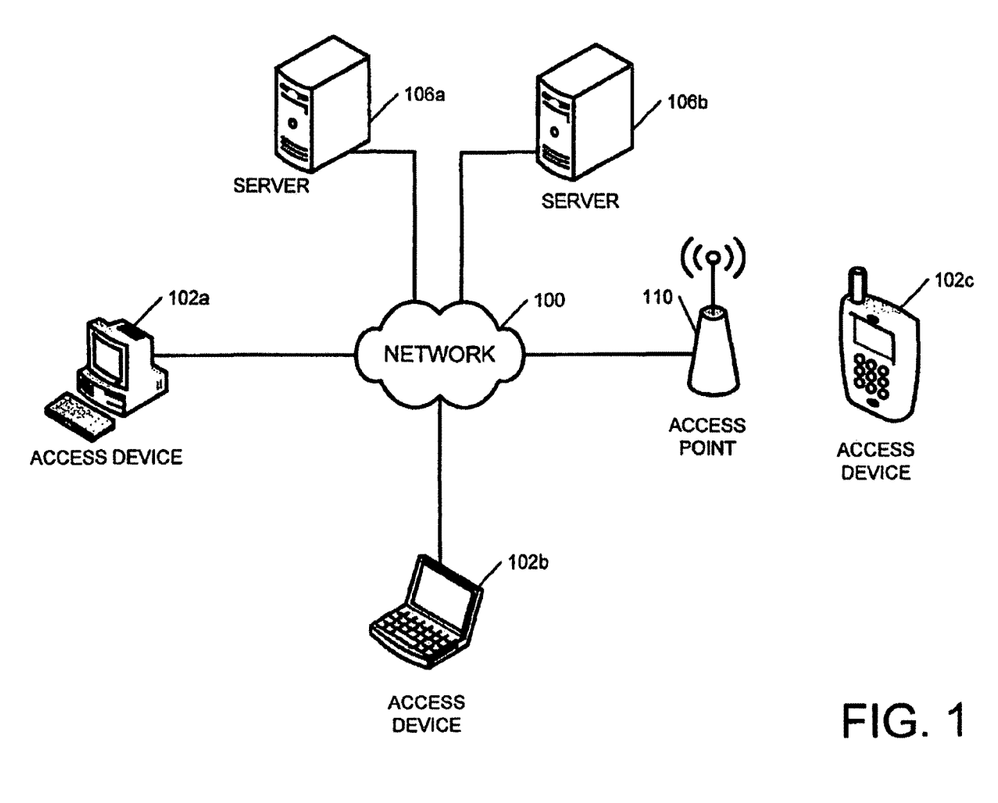
FIG. 1 illustrates an exemplary embodiment of a communications network, which may be configured to facilitate communication of data.

Referring to the drawings, FIG. 1 illustrates an exemplary embodiment of a communications network, which may be configured to facilitate communication of data. More specifically, as illustrated in the nonlimiting example of FIG. 1, a network 100 may be utilized and include a wide area network (WAN), such as the Internet, a public switched telephone network (PSTN), mobile communications network (MCN) and/or other network. Similarly, the network 100 may include a wireline and/or a wireless local area network (LAN). Regardless of the communications medium and protocol, the network 100 may be coupled to one or more access devices 102a, 102b, 102c. The access devices 102a, 102b, 102c (collectively referred to as "access device 102") may include a personal computer, thin client, laptop, cellular telephone, smartphone, and/or other device that is configured for communicating with the network 100. While the access devices 102a, 102b may be wireline devices, the access device 102c may be configured for wireless communications and may be configured to communicate with the network 100 via an access point 110, cellular tower and/or other wireless communications devices.

Additionally included in the nonlimiting example of FIG. 1 is the access point 110. The access point 110 may be configured as a wireless cellular tower, a wireless fidelity (Wi-Fi) hotspot, a worldwide interoperability for microwave access (WIMAX) tower, and/or other wireless node.

Also included in the nonlimiting example of FIG. 1 are servers 106a and 106b. The servers 106a and 106b may include blade servers, virtual environments, and/or other configurations and may be configured to provide data, such as general resources and/or specific resources to the access devices 102. Additionally, the servers 106a and 106b may be configured to facilitate the communication of electronic messages, which may include email, instant messages, Short Message Service (SMS) messages audio messages, video messages, and/or other electronic messages.

One should note that, while the diagram of FIG. 1 illustrates the servers 106a and 106b as single components, this is a nonlimiting example. More specifically, depending on the particular configuration, the servers 106a and/or 106b may include a plurality of servers, data storage components, and/or other components.

Figure 2:
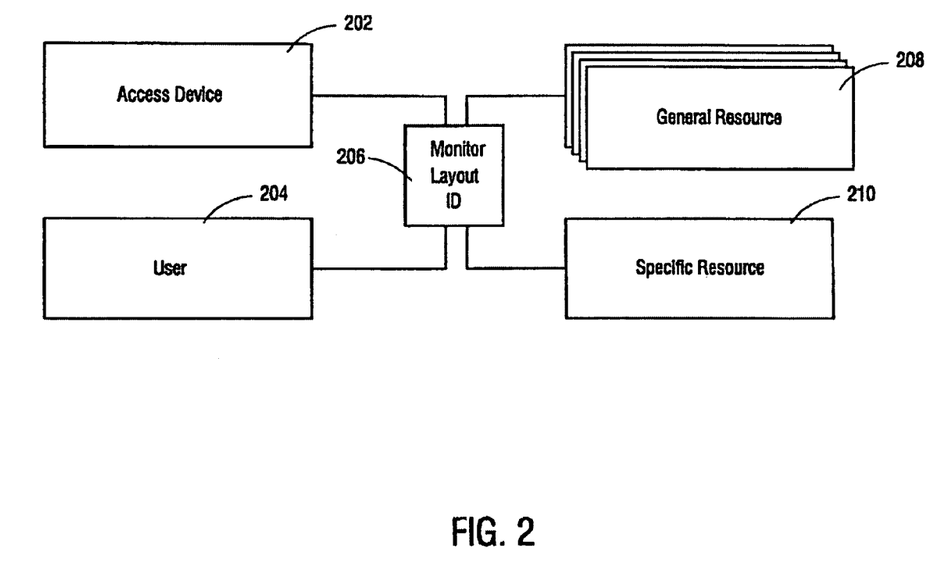
FIG. 2 depicts an additional network diagram, illustrating utilization of a monitor layout identifier (ID) in relation to other network components, similar to the diagram from FIG. 1.

FIG. 2 depicts an additional network diagram, illustrating utilization of a monitor layout identifier (ID) in relation to other network components, similar to the diagram from FIG. 1. As illustrated in the nonlimiting example of FIG. 2, a user 204 that is operating the access device 102 may utilize a monitor layout ID 206 to access one or more general resources 208 and/or specific resources 210. The monitor layout ID may include an identifier that is unique to a specific set of clients with the same monitor configuration.

Figure 3:
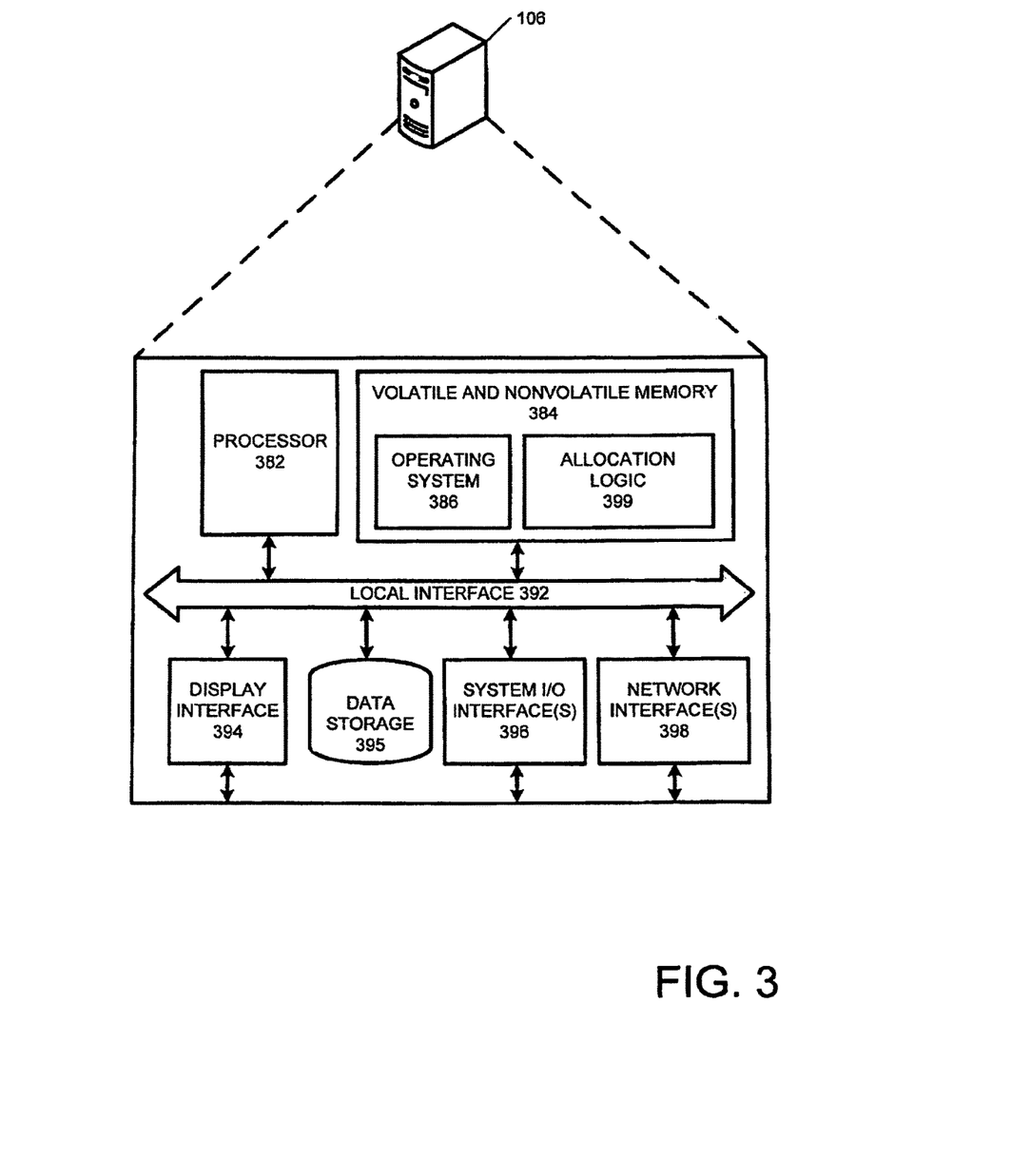
FIG. 3 illustrates an exemplary embodiment of a remote computing device, which may be configured to provide options for uploading and/or downloading content, such as in the network from FIG. 1.

FIG. 3 illustrates an exemplary embodiment of a server 106, which may be configured to provide options for uploading and/or downloading content, such as in the network from FIG. 1. Although a wire-line device is illustrated, this discussion can apply to wireless devices, as well. According to exemplary embodiments, in terms of hardware architecture, the server 106 may include a processor 382, a memory component 384, a display interface 394, data storage 395, one or more input and/or output (I/O) device interface(s) 396, and/or one or more network interfaces 398 that are communicatively coupled via a local interface 392. The local interface 392 can include, for example but not limited to, one or more buses and/or other wired or wireless connections. The local interface 392 may have additional elements, which are omitted for simplicity, such as controllers, buffers (caches), drivers, repeaters, and receivers to enable communications. Further, the local interface 392 may include address, control, and/or data connections to enable appropriate communications among the aforementioned components. The processor 382 may be a device for executing software, particularly software stored in the memory component 384. The processor 382 can include any custom made or commercially available processor, a central processing unit (CPU), an auxiliary processor among several processors associated with the server 106, a semiconductor based microprocessor (in the form of a microchip or chip set), a macroprocessor, and/or generally any device for executing software instructions.

The memory component 384 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 384 may incorporate electronic, magnetic, optical, and/or other types of storage media. One should note that the memory 384 can have a distributed architecture (where various components are situated remote from one another), but can be accessed by the processor 382.

The logic in the memory component 384 may include one or more separate programs, which may include an ordered listing of executable instructions for implementing logical functions. In the example of FIG. 3, the logic in the memory component 384 may include an operating system 386 and allocation logic 399. The operating system 386 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 384, so as to operate properly in connection with the operating system 386.

The input/output devices that may be coupled to the system 110 interface(s) 396 may include input devices, for example but not limited to, a keyboard, mouse, scanner, touch screen, microphone, etc. Further, the input/output devices may also include output devices, for example but not limited to, a printer, display, speaker, etc. Finally, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 398 for facilitating communication with one or more other devices. More specifically, network interface 398 may include any component configured to facilitate a connection with another device. While in some embodiments, among others, the server 106 can include the network interface 398 that includes a personal computer memory card international association (PCMCIA) card (also abbreviated as "PC card") for receiving a wireless network card, this is a nonlimiting example. Other configurations can include the communications hardware within the server 106, such that a wireless network card is unnecessary for communicating wirelessly. Similarly, other embodiments include the network interfaces 398 for communicating via a wired connection. Such interfaces may be configured with universal serial bus (USB) interfaces, serial ports, and/or other interfaces.

If the server 106 includes a personal computer, workstation, or the like, the software in the memory 384 may further include a basic input output system (BIOS) (omitted for simplicity). The BIOS may include a set of software routines that initialize and test hardware at startup, start the operating system 386, and support the transfer of data among the hardware devices. The BIOS may be stored in ROM so that the BIOS can be executed when the server 106 is activated.

When the server 106 is in operation, the processor 382 may be configured to execute software stored within the memory component 384, to communicate data to and from the memory component 384, and to generally control operations of the server 106 pursuant to the software. Software in the memory component 384, in whole or in part, may be read by the processor 382, perhaps buffered within the processor 382, and then executed.

One should note that while the description with respect to FIG. 3 includes the server 106 as a single component, this is a nonlimiting example. More specifically, in at least one embodiment, the server 106 can include a plurality of servers, personal computers, telephones, and/or other devices.

Additionally, while the logic is illustrated in FIG. 3 as including discrete software components, this is also a nonlimiting example. In at least one embodiment, the allocation logic 399 may each include one or more components, embodied in software, hardware, and/or firmware. As a nonlimiting example, some configurations of the allocation logic 399 may include a provisioning engine. As described in more detail below, the provisioning engine may be configured to perform one or more actions with regard to providing a virtual environment to a user. Similarly, while the logic is depicted as residing on a single device, such as server 106, the logic may include one or more components residing in one or more different devices.

Figure 4:
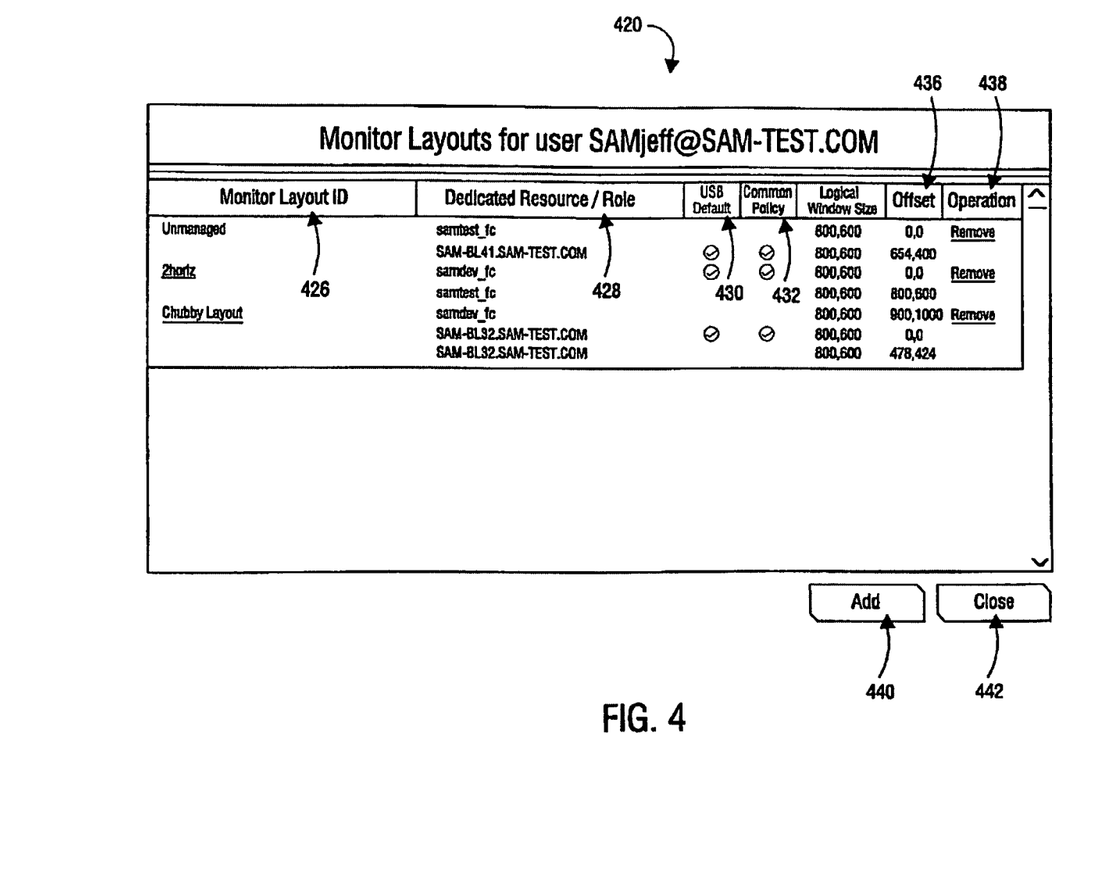
FIG. 4 depicts an exemplary interface that may be provided to a user and/or an administrator for providing a monitor layout ID, such as in the configuration from FIG. 2.

FIG. 4 depicts an exemplary interface that may be provided to a user and/or an administrator for providing a monitor layout ID. More specifically, the interface 420 may be configured to provide one or more monitor layout IDs, displayed in field 426, each with one or more dedicated resources and/or roles, as shown in field 428. Also included in the interface 420 are a USB default field 430, a common policy field 432, a logical window size field 434, an offset option 436, and an operation field 438.

As illustrated in the interface 420, the monitor layout ID field 426 may include an unmanaged monitor layout ID. The unmanaged monitor layout ID may be configured as a default monitor layout ID, such that if, upon logging a user onto the system, if the server 106 does not recognize the access device 102 that it is attempting to access data from the server 106, the unmanaged monitor layout ID is used, if defined. According to the dedicated resource/role field 428, the unmanaged monitor layout ID may be associated with a role such that the unmanaged monitor layout ID automatically connects with an unmanaged remote device. Additionally, the unmanaged monitor layout ID may also be associated with a resource embodied as a specific computer "sam-bl41.sam-test.com."

Additionally, the USB default field 430 may be configured to indicate whether the particular resource/role is accessible via USB, as a default. The common policy field 432 may indicate which session provides global connection parameters. The logical window size field 434 indicates that size of the window that will be allocated to this resource. Additionally, the offset field 436, indicates that offset for that resource. Additionally, the operation field 438 may be configured to provide the option to remove one or more of the monitor layout IDs from the user's profile. Also included are an add option 440 for adding a monitor layout ID and a close option 442 for closing the interface 420.

Figure 5:
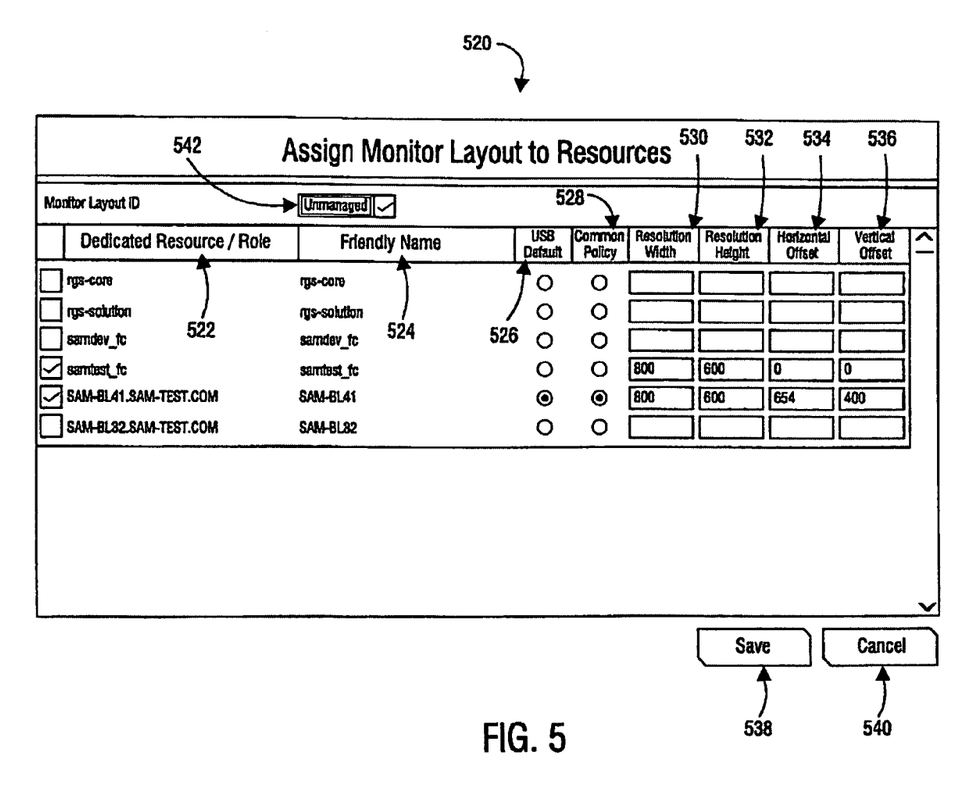
FIG. 5 depicts an exemplary interface that may be provided to assign monitor layout resources to a monitor layout ID, similar to the interface from FIG. 4.

FIG. 5 depicts an exemplary interface that may be provided to assign resources to a monitor layout ID, similar to the interface from FIG. 4. As illustrated in FIG. 5, an assign monitor layout to resources interface 520 may be provided via selection of one or more of the monitor layouts in field 426 and/or from choosing the add button 440 from FIG. 4. More specifically, the interface 520 may include a dedicated resource/role field 522, a friendly name field 524, a USB default field 526, a common policy field 528, a resolution width 530, a resolution height field 532, a horizontal offset field 534, and a vertical offset field 536. As a nonlimiting example, the administrator, via the interface 520 can select one or more dedicated resources and/or roles for a particular monitor layout ID. Additionally, the administrator can view a predetermined friendly name (field 524) associated with the one or more resources/roles, as well as select whether the resource/role has a USB default (field 526), and a common policy (filed 528).

Similarly, the interface 520 may be configured to provide an option, to select the desired resolution width (field 530), height (field 532), horizontal offset (field 534), and vertical offset (field 536), as displayed in fields 434 and 436 from FIG. 4. Additionally, a save option 538 and a cancel option 540 may also be provided, as well as a monitor layout ID selection option 542 for changing the displayed monitor layout ID. In operation, these fields may be configured to determine resolution of a resource and placement of the remote window on the access device 102

Figure 6:
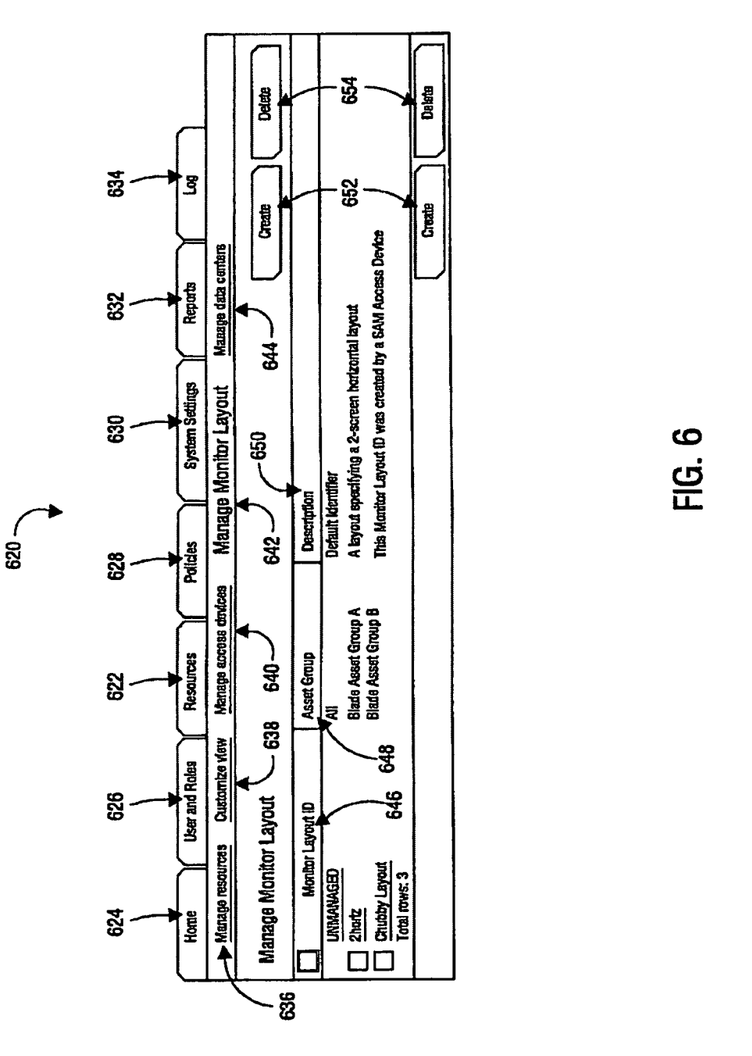
FIG. 6 depicts an exemplary interface that may be provided to manage a monitor layout, similar to the interface from FIG. 5.

FIG. 6 depicts an exemplary interface that may be provided to manage a monitor layout, similar to the interface from FIG. 5. As illustrated in FIG. 6, a manage monitor layout interface 620 is provided, which may provide access to resources information (option 622), as illustrated. Additionally, the interface 620 may be configured to provide general information (via option 624), user and roles information (via option 626), policies information (via option 628), system settings (via option 630), reports information (via option 632), and/or log information (via option 634).

Additionally, in the resources view of the interface 620, the user and/or administrator 204 may be provided with a manage resources option 636, a customize view option 638, a manage access devices 640, a manage monitor layout option 642, and a manage data centers option 644. By selecting the manage monitor layout option 642, the user and/or administrator 204 may be provided with a monitor layout ID field 646 to manage one or more of the monitor layouts. Additionally, an asset group field 648 may be provided to indicate to which asset groups the monitor layout IDs belong. A description field 650 may be included and provide a description of the respective monitor layout IDs. Additionally included is a create option 652 for creating a new monitor layout ID and a delete option 654 for deleting a monitor layout ID.

Figure 7:
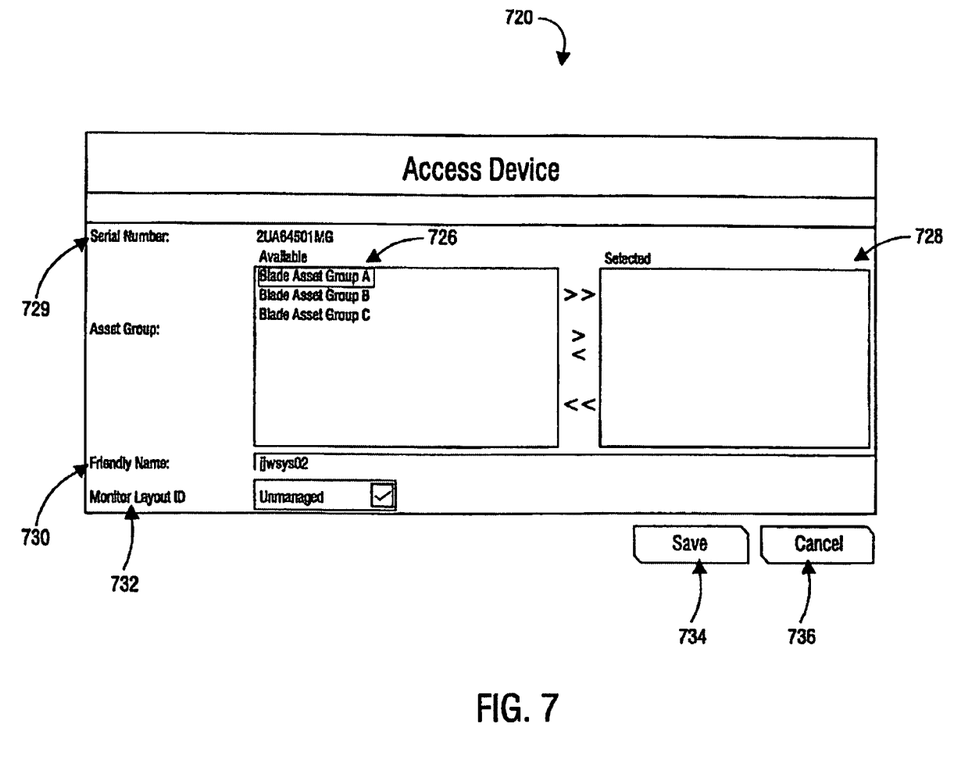
FIG. 7 depicts an exemplary interface that may be provided, to manage an access device, similar to the interface from FIG. 6.

FIG. 7 depicts an exemplary interface that may be provided to manage an access device, similar to the interface from FIG. 6. As illustrated, an access device interface 720 may be provided in response to selection of the manage access devices option 640, from FIG. 6. The access device interface 720 may be configured to provide a serial number of an access device 102, as well as available access groups for this access device 102. From the available asset groups 726, the user may select (and/or unselect), via field 728, asset groups to associate with the selected access device 102. Additionally, the interface 720 may be configured to provide an option 730 to amend the friendly name associated with the access device 102. The monitor layout ID may be changed via option 732.

Figure 8:
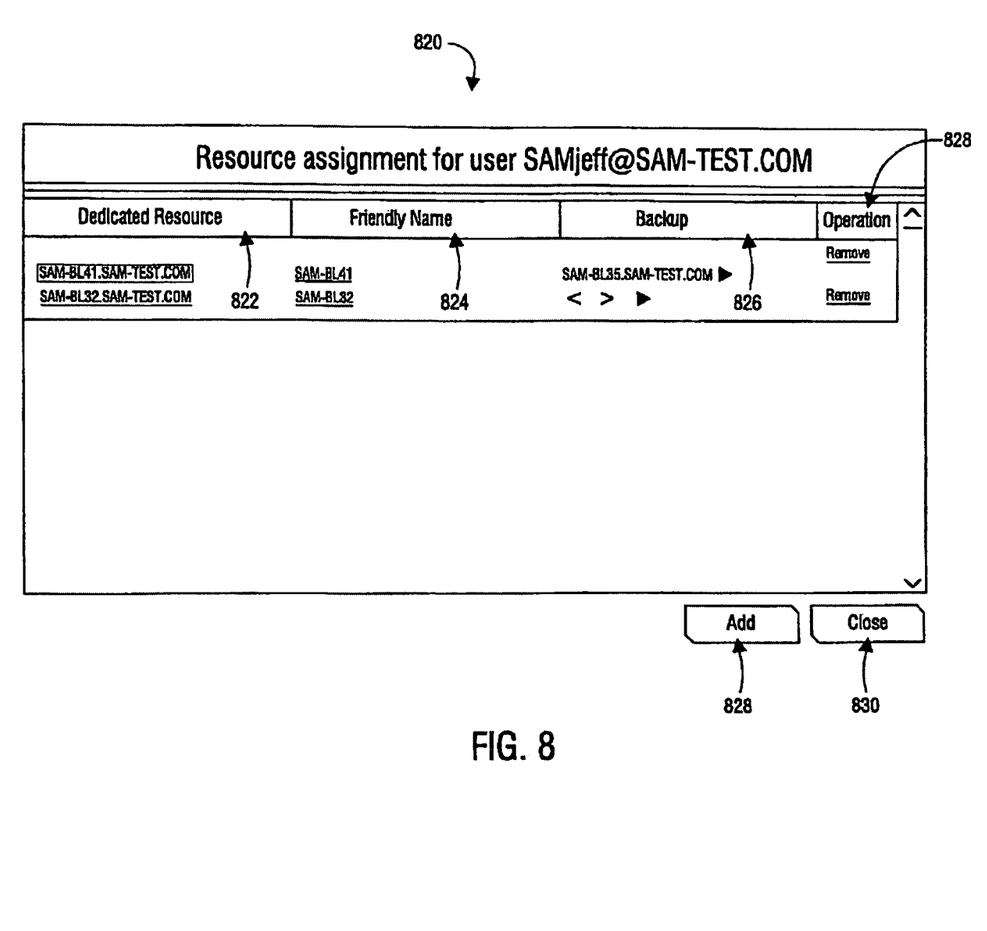
FIG. 8 depicts an exemplary interface for resource assignment, similar to the interface from FIG. 7.

FIG. 8 depicts an exemplary interface for resource assignment, similar to the interface from FIG. 7. As illustrated in the nonlimiting example of FIG. 8, one or more dedicated resources for an access device 102 and/or user 204 may be listed in field 822. Additionally, a friendly name for the dedicated resources may be provided in friendly name field 824. A backup (e.g., failover) device for the one or more dedicated resources may be provided in field 826. The designated backup device may be determined by an administrator and/or user 204. Additionally, operation field 826 may be provided for removing one or more of the dedicated resources. An add option 828 and a close option 830 may also be provided.

Figure 9:
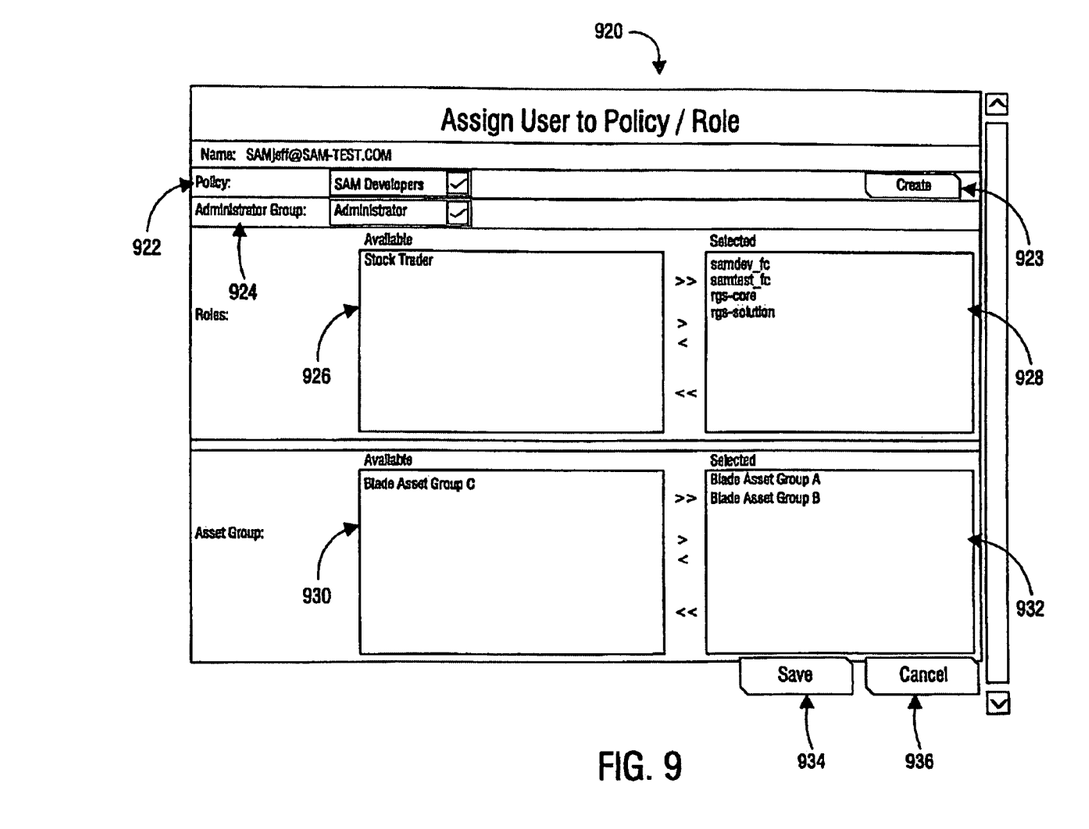
FIG. 9 depicts an exemplary interface for assigning a policy and/or role to a user, similar to the interface from FIG. 8.

FIG. 9 depicts an exemplary interface for assigning a policy and/or role to a user, similar to the interface from FIG. 8. As illustrated in the nonlimiting example of FIG. 9, an interface 920 may be provided by selection of the policy option 628, from FIG. 6. More specifically, the interface 920 may be configured to provide data related to assigning a user to a policy and/or role. The interface 920 may include, a policy option 922 for selecting a desired policy for the selected user 204. Similarly, an administrator group 924 may be provided for selecting an administrator group for the user 204. Additionally, a new policy can be created via selection of option 923.

An available roles field 926 may be configured to provide available roles that apply to a user 204. By selecting one or more of the roles from field 926, the selected roles may be presented in selected field 928. Similarly, available asset groups may be provided in field 930. Selecting one or more of the available asset groups from field 930 may facilitate display of those asset groups in selected field 932. Also included is a save option 934 and a cancel option 936.

Figure 10:
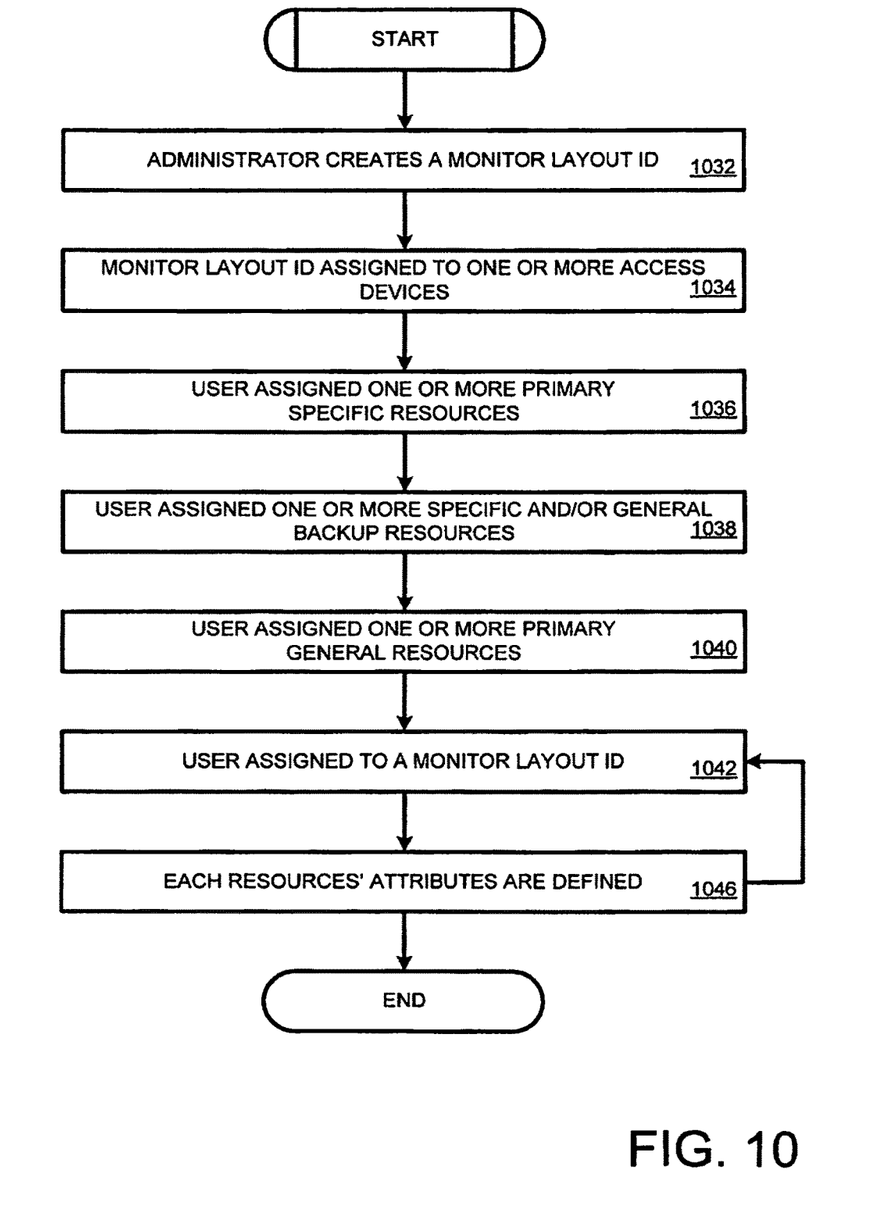
FIG. 10 depicts an exemplary process that may be utilized for allocating resources, such as in the network from FIG. 1.

FIG. 10 depicts an exemplary process that may be utilized for allocating resources, such as in the network from FIG. 1. As illustrated in the nonlimiting example, an administrator can create a monitor layout ID 206, such as illustrated in FIG. 6 (block 1032). This identifier may be a localized name. The monitor layout ID 206 can be assigned to one or more access devices 102, such as illustrated in FIG. 7 (block 1034). A user may be assigned one or more primary specific resources (block 1036), along with a specific and/or general backup resource, as illustrated in FIG. 8 (block 1038). Additionally, the user may be assigned one or more primary general resources, such as in FIG. 9 (block 1040). Similarly, the user may be assigned a monitor layout ID (block 1042). Each of the resources' may be defined, as illustrated in FIG. 5 (block 1046). Additionally, a user's experience may be defined for each client type they might login to. Accordingly, for each monitor layout ID, the user experience could be defined. Accordingly, in response to a determination that there are more than one monitor layout ID, block 1046 may return to block 1042.

Figure 11:
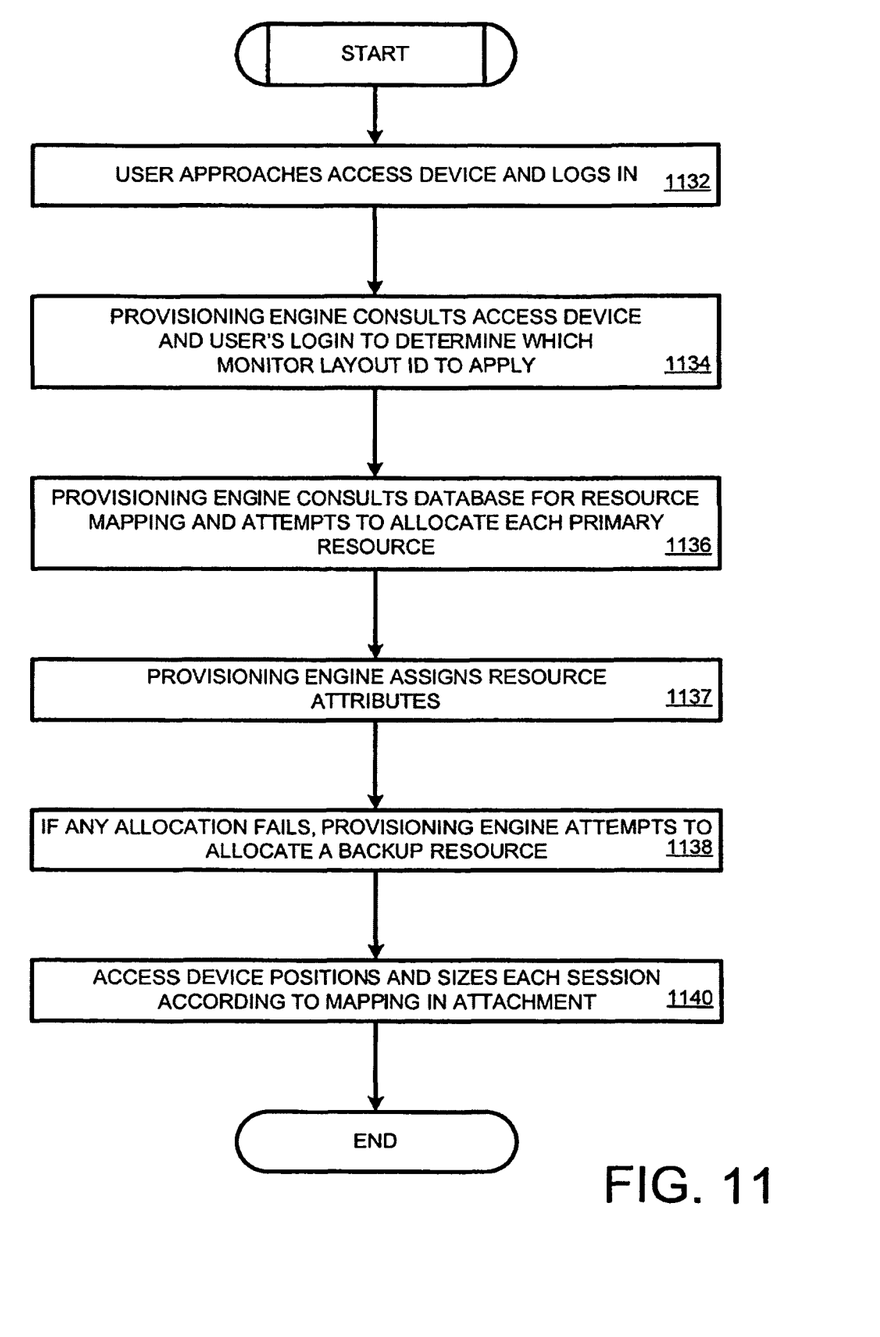
FIG. 11 depicts an exemplary process that may be utilized for accessing at least one allocated resource, similar to the diagram from FIG. 10.

FIG. 11 depicts an exemplary process that may be utilized for accessing at least one allocated resource, similar to the diagram from FIG. 10. As illustrated in the nonlimiting example of FIG. 11, a user may approach an access device 102 and login to that machine (block 1132). The provisioning engine may consult the access device 102 to determine which monitor layout ID to apply (block 1134). The provisioning engine can consult the database for resource mapping and may attempt to allocate each primary resource to a user/monitor layout ID (block 1136). The provisioning engine can use the <monitor layout ID, user name> pair to determine resources. Additionally, the provisioning engine can assign resource attributes, including but not limited to resolution, offset, etc. (block 1137). If any of resource the allocations fail, the provisioning engine may attempt to allocate at least one backup resource (block 1138). Additionally, the access device 102 may position and size each session according to mapping received from the provisioning engine (block 1140), such as illustrated FIG. 5.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can", "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein, within the scope of this disclosure.

Therefore, at least the following is claimed:

1. A method comprising:
determining, by a system comprising a processor, a monitor layout identifier of an access device, wherein the monitor layout identifier is unique to a set of access devices having a same monitor configuration, the set of access devices being able to remotely access resources over a network, the monitor configuration comprising a size of a display window and an offset of the display window;
accessing, by the system, a resource mapping using the monitor layout identifier to identify primary resources and a backup resource corresponding to the monitor layout identifier;
assigning, by the system to a user of the access device based on administrator selection in a user interface, a primary image comprising applications and the primary resources;
assigning, by the system to the user of the access device based on administrator selection in the user interface, the backup resource;
defining a universal serial bus configuration of a remote session based on the monitor layout identifier;
providing, by the system, the primary resources to the access device to cause the access device to position and size the display window according to the monitor configuration for the remote session that accesses, by the access device, the primary resources; and
accessing, by the system, the primary image based on the user successfully logging on at the access device via a user name and a password.

2. The method of claim 1, wherein assigning the primary image comprises assigning a primary server computer resource.

3. The method of claim 1, wherein assigning the backup resource occurs in response to a failure when assigning the primary image.

4. A system comprising:
a processor; and
a non-transitory storage medium that stores code executable on the processor to:
determine a monitor layout identifier for an access device, wherein the monitor layout identifier is unique to a set of access devices having a same monitor configuration, the set of access devices being able to remotely access resources over a network, the monitor configuration comprising a size of a display window and an offset of the display window;
access a resource mapping using the monitor layout identifier to identify a primary resource and a backup resource corresponding to the monitor layout identifier;
assign, to the user of the access device based on administrator selection in a user interface, a primary image comprising an application and the primary resource;
assign, to the user of the access device based on administrator selection in the user interface, the backup resource that comprises a failover resource;
define a universal serial bus configuration of a remote session based on the monitor layout identifier;
provide the primary resource to the access device to cause the access device to position and size the display window according to the monitor configuration for the remote session that accesses, by the access device, the primary resource; and
access the primary image based on the user successfully logging on at the access device via a user name and a password.

5. The system of claim 4, wherein the primary image comprises a primary computer resource.

6. A non-transitory storage medium storing instructions that upon execution cause a system to:
determine a monitor layout identifier for an access device, wherein the monitor layout identifier is unique to a set of access devices having a same monitor configuration, the set of access devices being able to remotely access resources over a network, the monitor configuration comprising a size of a display window and an offset of the display window;
access a resource mapping using the monitor layout identifier to identify a primary resource and a backup resource corresponding to the monitor layout identifier;
assign to a user of the access device based on administrator selection in a user interface, a primary image comprising an application and the primary resource;
assign to the user of the access device based on administrator selection in the user interface, a backup image comprising the backup resource;
define a universal serial bus configuration of a remote session based on the monitor layout identifier;
provide the primary resource to the access device to cause the access device to position and size the display window according to the monitor configuration for the remote session that accesses, by the access device, the primary resource; and
access the primary image based on the user successfully logging on at the access device via a user name and a password.

7. The method of claim 1, comprising specifying, based on the monitor layout identifier of the access device, a friendly name, a resolution, a logical size of a window, and an offset.

8. The method of claim 1, wherein the monitor layout identifier specifies a resolution width and resolution height, and wherein the offset comprises a horizontal offset and a vertical offset of the display window.

9. The method of claim 1, wherein the primary image is associated with a server, and the backup resource is associated with a different server.

10. The method of claim 1, wherein the primary image is imaged with office suite applications.

11. The method of claim 1, comprising provisioning a backup image comprising the backup resource to the user via the access device if the primary resource is unavailable to the user via the access device.

12. The method of claim 1, wherein the monitor layout identifier identifies an unmanaged monitor layout configured as a default monitor layout.

13. The system of claim 4, wherein the code is executable on the processor to set a friendly name of a server comprising the primary resource.

14. The system of claim 4, wherein the monitor layout identifier virtually links the access device, a user, and the primary resource and the backup resource.

15. The system of claim 4, wherein the code is executable on the processor to assign the backup resource responsive to a failure when assigning the primary image.

16. The non-transitory storage medium of claim 6, wherein the instructions upon execution cause the system to:
    assign the backup image responsive to a failure in assigning the primary image.

\* \* \* \* \*